(12) United States Patent
Weyerhaeuser et al.

(10) Patent No.: US 9,146,979 B2
(45) Date of Patent: Sep. 29, 2015

(54) OPTIMIZATION OF BUSINESS WAREHOUSE QUERIES BY CALCULATION ENGINES

(71) Applicants: Christoph Weyerhaeuser, Heidelberg (DE); Tobias Mindnich, Walldorf (DE); Daniel Baeumges, Viersen (DE); Johannes Merx, Heidelberg (DE)

(72) Inventors: Christoph Weyerhaeuser, Heidelberg (DE); Tobias Mindnich, Walldorf (DE); Daniel Baeumges, Viersen (DE); Johannes Merx, Heidelberg (DE)

(73) Assignee: SAP SE, Walldorf (DE)

( * ) Notice: Subject to any disclaimer, the term of this patent is extended or adjusted under 35 U.S.C. 154(b) by 232 days.

(21) Appl. No.: 13/916,948

(22) Filed: Jun. 13, 2013

(65) Prior Publication Data
US 2014/0372365 A1   Dec. 18, 2014

(51) Int. Cl.
*G06F 17/30* (2006.01)
(52) U.S. Cl.
CPC .................. *G06F 17/30592* (2013.01)
(58) Field of Classification Search
CPC .............................................. G06F 17/30592
See application file for complete search history.

(56) References Cited

U.S. PATENT DOCUMENTS

| | | | |
|---|---|---|---|
| 5,960,428 A | 9/1999 | Lindsay et al. | |
| 6,618,719 B1 | 9/2003 | Andrei | |
| 7,574,424 B2 | 8/2009 | Chowdhuri | |
| 7,668,801 B1 | 2/2010 | Koudas et al. | |
| 8,195,643 B2 | 6/2012 | Weyerhaeuser et al. | |
| 8,224,807 B2 | 7/2012 | Lim et al. | |
| 8,229,917 B1 | 7/2012 | Aneas et al. | |
| 2006/0218123 A1 | 9/2006 | Chowdhuri et al. | |
| 2009/0055349 A1 | 2/2009 | Ahmed | |
| 2009/0055350 A1 | 2/2009 | Branish et al. | |
| 2009/0070359 A1* | 3/2009 | Nolan | 707/102 |
| 2011/0035369 A1 | 2/2011 | Halasipuram et al. | |
| 2011/0173224 A1 | 7/2011 | Toledo et al. | |
| 2012/0109934 A1* | 5/2012 | Weyerhaeuser et al. | 707/713 |
| 2012/0246158 A1 | 9/2012 | Ke et al. | |

FOREIGN PATENT DOCUMENTS

EP          1308852 A1      5/2003

OTHER PUBLICATIONS

Bizarro, Pedro, et "al.", "Adding a Performance-Oriented Perspective to Data Warehouse Design", DaWaK "2002", LNCS "2454", Springer-Verlag, Berlin, Germany, © "2002", "pp. 232-244".*

* cited by examiner

*Primary Examiner* — Belix M Ortiz Ditren
(74) *Attorney, Agent, or Firm* — Mintz Levin Cohn Ferris Glovsky and Popeo, P.C.

(57) ABSTRACT

A query is received by a database server from a remote application server. The query is associated with a calculation scenario that defines a data flow model that includes one or more calculation nodes with each calculation node defining one or more operations to execute on the database server. Thereafter, at least one of the calculation nodes is transformed into a star schema. Next, the database server instantiates the calculation scenario with the transformed at least one calculation node. Subsequently, a calculation engine of the database server executes the operations defined by the calculation nodes of the instantiated calculation scenario other than the transformed at least one calculation node and, additionally, an OLAP engine executes the transformed at least one calculation node to collectively result in a responsive data set.

31 Claims, 5 Drawing Sheets

OPTIMIZATION OF BUSINESS WAREHOUSE QUERIES BY CALCULATION ENGINES

TECHNICAL FIELD

The subject matter described herein relates to a calculation engine that optimizes business warehouse queries.

BACKGROUND

Data flow between an application server and a database server is largely dependent on the scope and number of queries generated by the application server. Complex calculations can involve numerous queries of the database server which in turn can consume significant resources in connection with data transport as well as application server-side processing of transported data. Engines can sometimes be employed by applications and/or domain specific languages in order to effect such calculations.

SUMMARY

In one aspect, a query is received by a database server from a remote application server. The query is associated with a calculation scenario that defines a data flow model that includes one or more calculation nodes. Each calculation node defines one or more operations to execute on the database server. Thereafter, at least one of the calculation nodes is transformed into a star schema. The database server then instantiates the calculation scenario with the transformed at least one calculation node. Subsequently, a calculation engine of the database server executes the operations defined by the calculation nodes of the instantiated calculation scenario other than the transformed at least one calculation node and an OLAP engine executes the transformed at least one calculation node to collectively result in a responsive data set. Thereafter, the database server provides the data set to the application server.

One of the calculation nodes can define a join with aggregation operation. At least a portion of paths and/or attributes defined by the calculation scenario can, in some cases, not be required to respond to the query. In such cases, the instantiated calculation scenario omits the paths and attributes defined by the calculation scenario that are not required to respond to the query.

At least one of the calculation nodes can filter results obtained from the database server. At least one of the calculation nodes can sort results obtained from the database server. The calculation scenario can be instantiated in a calculation engine layer by a calculation engine. The calculation engine layer can interacts with a physical table pool and a logical layer. The physical table pool can include physical tables containing data to be queried, and the logical layer can define a logical metamodel joining at least a portion of the physical tables in the physical table pool.

An input for each calculation node can include one or more of: a physical index, a join index, an OLAP index, and another calculation node. Each calculation node can have at least one output table that is used to generate the final result set. At least one calculation node can consume an output table of another calculation node.

In some variations, the query can be forwarded to a calculation node in the calculation scenario that is identified as a default node if the query does not specify a calculation node at which the query should be executed.

The calculation scenario can include database metadata. The calculation scenario can be exposed as a database calculation view. In such cases, a SQL processor can invoke the calculation engine to execute the calculation scenario behind the database calculation view. The calculation engine can invoke the SQL processor for executing set operations. The SQL processor can invoke the calculation engine when executing SQL queries with calculation views.

Computer program products are also described that comprise non-transitory computer readable media storing instructions, which when executed one or more data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, by minimizing temporary result materialization when executing complex queries, a calculation engine can avoid unnecessarily high CPU and memory consumption which, in turn, decreases query times.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
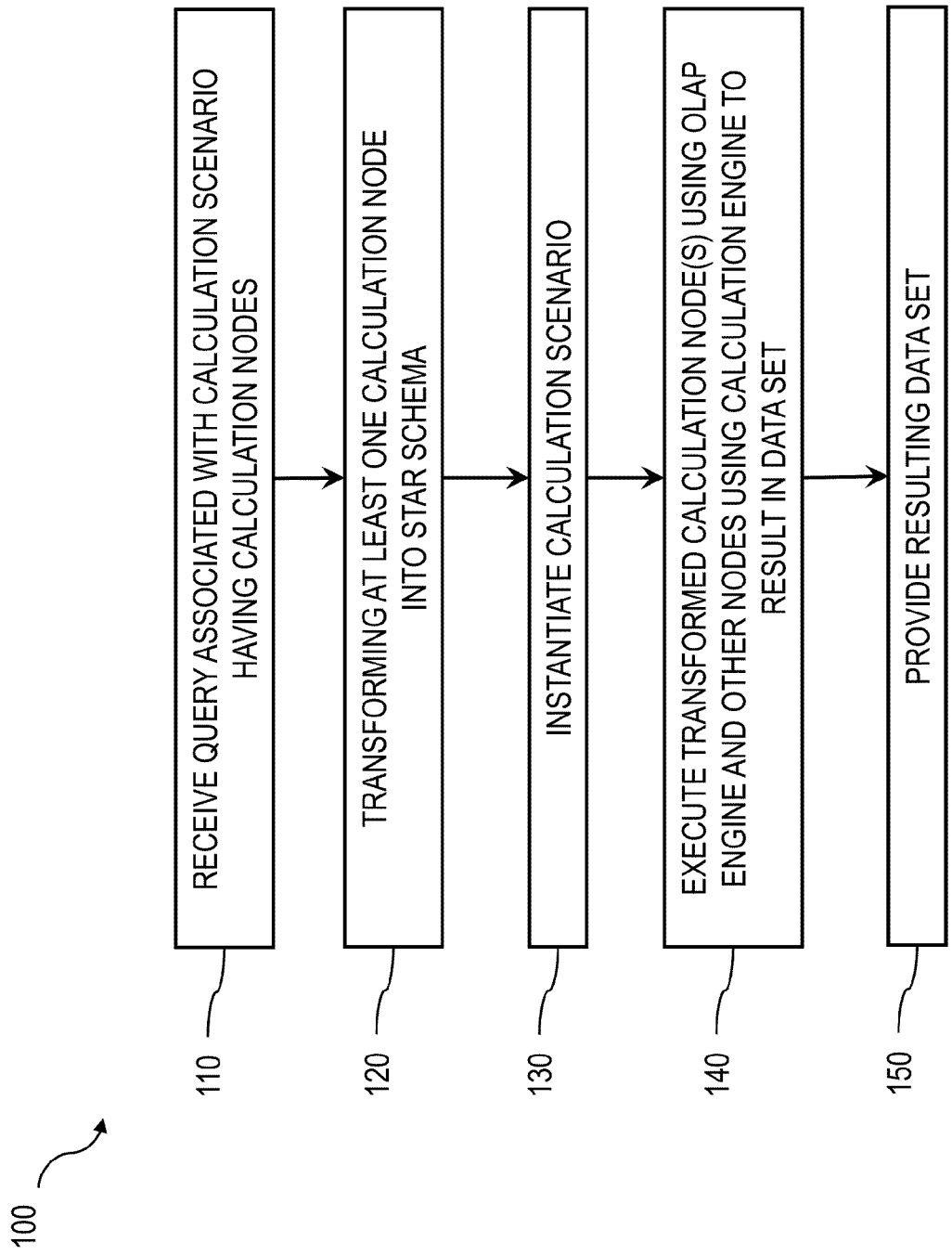
FIG. 1 is a process flow diagram illustrating a method for optimizing business warehouse queries.

FIG. 1 is a process flow diagram 100 illustrating a method in which, at 110, a query is received by a database server from a remote application server. The query is associated with a calculation scenario that defines a data flow model that includes one or more calculation nodes with each calculation node defining one or more operations to execute on the database server. Thereafter, at 120, at least one of the calculation nodes is transformed into a star schema. Next, at 130, the database server instantiates the calculation scenario with the transformed at least one calculation node. Subsequently, at 140, a calculation engine of the database server executes the operations defined by the calculation nodes of the instantiated calculation scenario other than the transformed at least one calculation node and, additionally, an OLAP engine executes the transformed at least one calculation node to collectively result in a responsive data set. The database server then, at 150, provides the data set to the application server.

The subject matter described herein can enable an application developer to define a data flow model to push down a high level algorithm to a database. A developer can define a calculation scenario which describes this algorithm in a general way as data flow consisting of calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

During query time (i.e., the time in which a database is queried), the data flow specified by a calculation scenario is instantiated. During instantiation, the calculation scenario is compacted to only include queries requirements by removing useless pathes and attributes (that are not requested) within the calculation scenario. This compaction reduces calculation time and also minimizes the total amount of data that must be processed.

Figure 2:
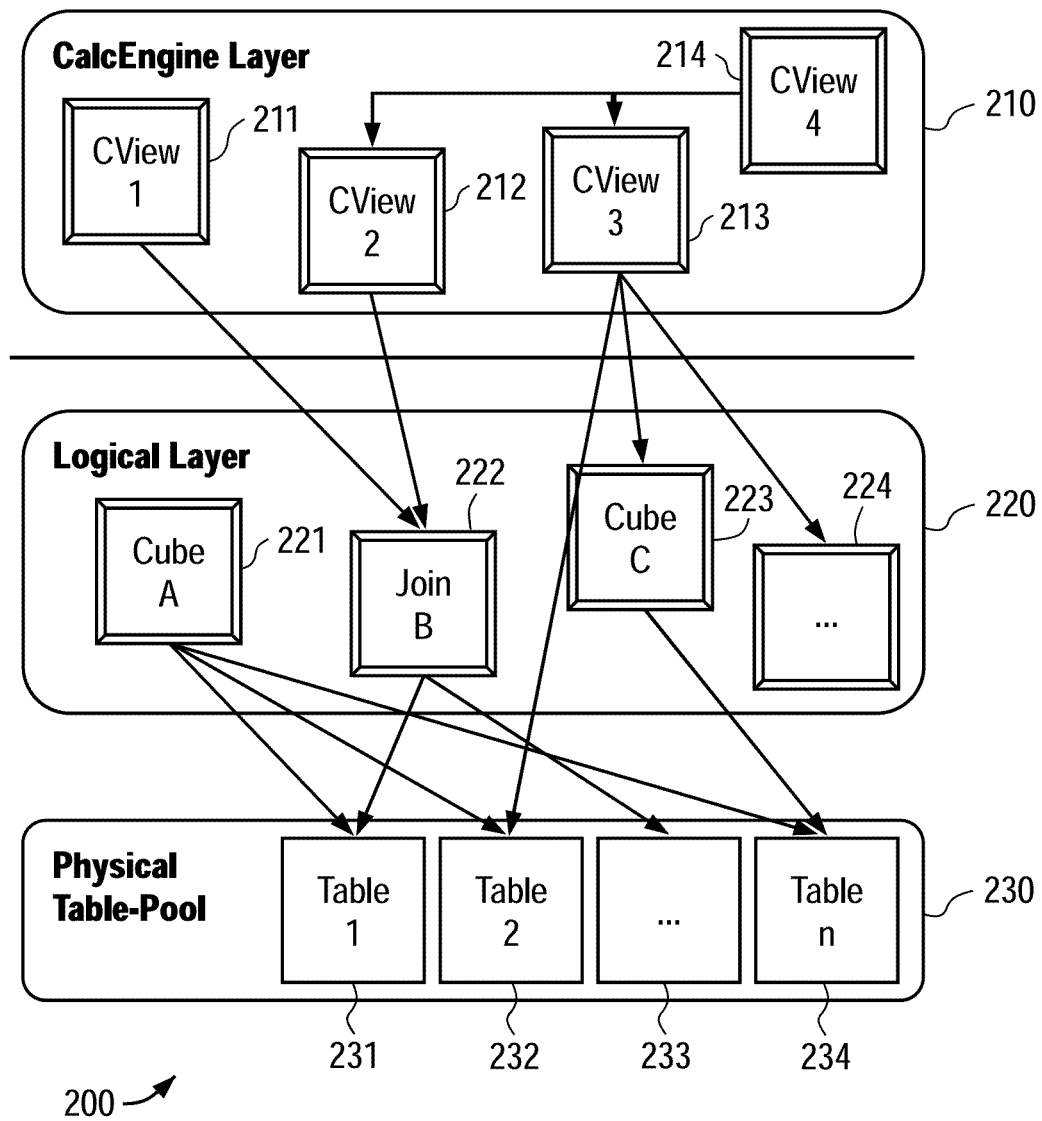
FIG. 2 is a diagram illustrating a calculation engine layer, a logical layer, a physical table pool and their interrelationship.

FIG. 2 is a diagram 200 that illustrates a database system in which there are three layers, a calculation engine layer 210, a logical layer 220, and a physical table-pool 230. Calculation scenarios can be executed by a calculation engine which can form part of a database or which can be part of the calculation engine layer 210 (which is associated with the database). The calculation engine layer 210 can be based on and/or interact with the other two layers, the logical layer 220 and the physical table pool 230. The basis of the physical table pool 230 consists of physical tables (called indexes) containing the data. Various tables can then be joined using logical metamodels defined by the logical layer 220 to form a new index. For example, the tables in a cube (OLAP view) can be assigned roles (e.g., fact or dimension tables) and joined to form a star schema. It is also possible to form join indexes, which can act like database view in environments such as the Fast Search Infrastructure (FSI) by SAP AG.

As stated above, calculation scenarios can include individual calculation nodes 211-214, which in turn each define operations such as joining various physical or logical indexes and other calculation nodes (e.g., CView 4 is a join of CView 2 and CView 3). That is, the input for a calculation node 211-214 can be one or more physical, join, or OLAP views or calculation nodes.

In calculation scenarios, two different representations can be provided. First, a pure calculation scenario in which all possible attributes are given. Second, an instantiated model that contains only the attributes requested in the query (and required for further calculations). Thus, calculation scenarios can be created that can be used for various queries. With such an arrangement, calculation scenarios can be created which can be reused by multiple queries even if such queries do not require every attribute specified by the calculation scenario. For on-the-fly scenarios this means that the same calculation scenario (e.g., in XML format, etc.) can be used for different queries and sent with the actual query. The benefit is that on application server side the XML description of a calculation scenario can be used for several queries and thus not for each possible query one XML has to be stored.

On-the-fly calculation scenarios as used herein can be seen as anonymous calculation scenarios in that they do not require an identification because they are not registered in the database catalog. On-the-fly calculation scenarios are only used once, so they are not stored in the database. Thus implies that an on-the-fly calculation scenario cannot be referenced from another calculation scenario but an on-the-fly calculation scenario can reference another persisted calculation scenario (via a calculation node 211-214 in the on-the-fly calculation scenario). An on-the-fly calculation scenario can also reference database objects from the logical layer (220) and/or the table pool (230).

Further details regarding calculation engine architecture and calculation scenarios can be found in U.S. Pat. No. 8,195,643, the contents of which are hereby fully incorporated by reference.

Figure 3:
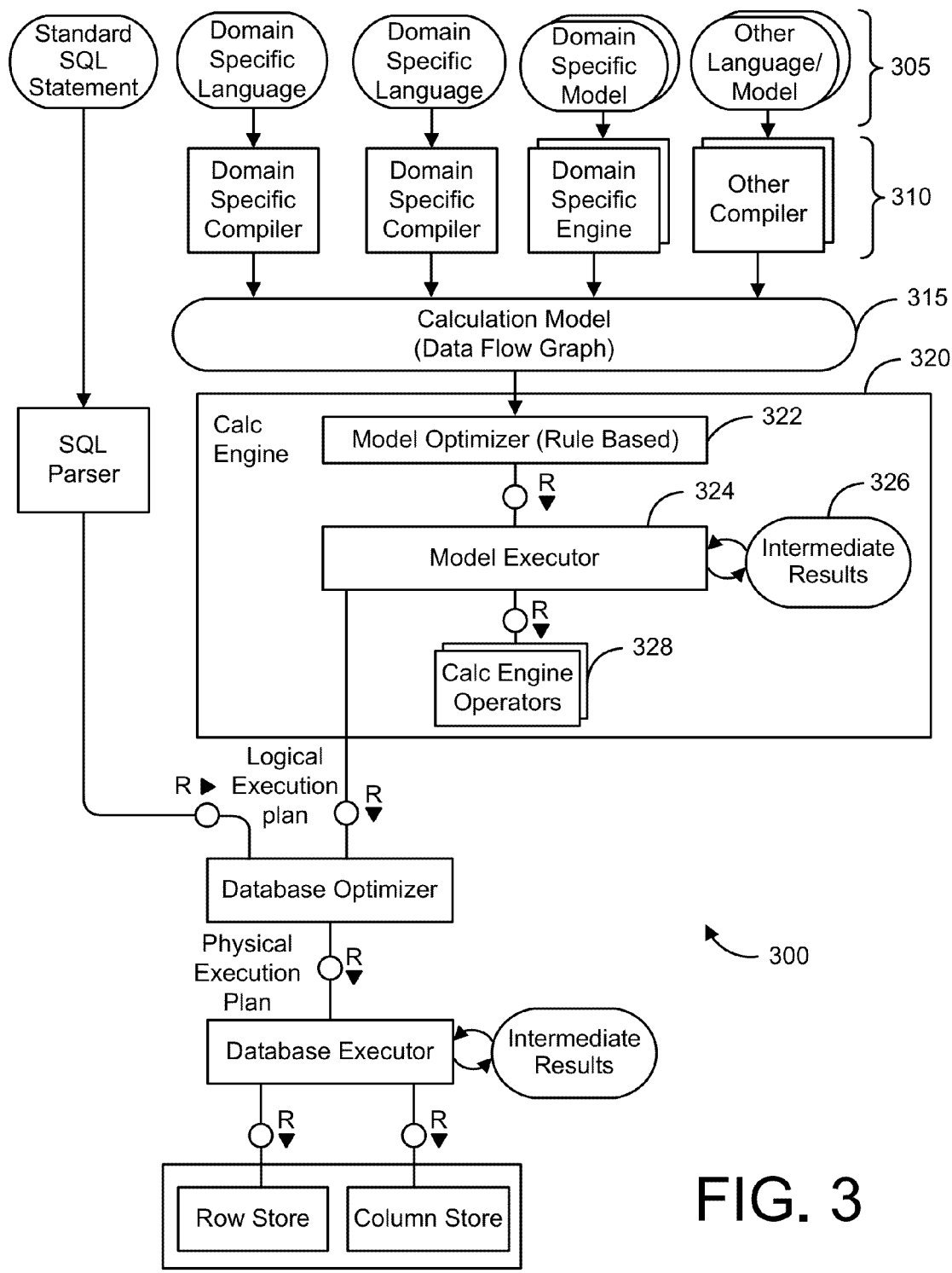
FIG. 3 is a diagram illustrating an architecture for processing and execution control.

FIG. 3 is a diagram 300 illustrating a sample architecture for request processing and execution control. As shown in FIG. 3, artifacts 305 in different domain specific languages can be translated by their specific compilers 310 into a common representation called a "calculation scenario" 315 (illustrated as a calculation model). To achieve enhanced performance, the models and programs written in these languages are executed inside the database server. This arrangement eliminates the need to transfer large amounts of data between the database server and the client application. Once the different artifacts 305 are compiled into this calculation scenario 315, they can be processed and executed in the same manner. The execution of the calculation scenarios 315 is the task of a calculation engine 320.

The calculation scenario 315 can be a directed acyclic graph with arrows representing data flows and nodes that represent operations. Each calculation node has a set of inputs and outputs and an operation that transforms the inputs into the outputs. In addition to their primary operation, each calculation node can also have a filter condition for filtering the result set. The inputs and the outputs of the operations can be table valued parameters (i.e., user-defined table types that are passed into a procedure or function and provide an efficient way to pass multiple rows of data to the application server). Inputs can be connected to tables or to the outputs of other calculation nodes. Calculation scenarios 315 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 315 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result he or she can use a split. Then, the nodes can be automatically multiplied between split and merge and partition the data.

Calculation scenarios 315 are more powerful than traditional SQL queries or SQL views for many reasons. One reason is the possibility to define parameterized calculation schemas that are specialized when the actual query is issued. Unlike a SQL view, a calculation scenario 315 does not describe the actual query to be executed. Rather, it describes the structure of the calculation. Further information is supplied when the calculation scenario is executed. This further information can include parameters that represent values (for example in filter conditions). To obtain more flexibility, it is also possible to refine the operations when the model is invoked. For example, at definition time, the calculation scenario 315 may contain an aggregation node containing all attributes. Later, the attributes for grouping can be supplied with the query. This allows having a predefined generic aggregation, with the actual aggregation dimensions supplied at invocation time. The calculation engine 320 can use the actual parameters, attribute list, grouping attributes, and the like supplied with the invocation to instantiate a query specific calculation scenario 315. This instantiated calculation scenario 315 is optimized for the actual query and does not contain attributes, nodes or data flows that are not needed for the specific invocation.

When the calculation engine 320 gets a request to execute a calculation scenario 315, it can first optimize the calculation scenario 315 using a rule based model optimizer 322. Examples for optimizations performed by the model optimizer can include "pushing down" filters and projections so that intermediate results 326 are narrowed down earlier, or the combination of multiple aggregation and join operations into one node. The optimized model can then be executed by a calculation engine model executor 324 (a similar or the same model executor can be used by the database directly in some cases). This includes decisions about parallel execution of operations in the calculation scenario 315. The model executor 324 can invoke the required operators (using, for example, a calculation engine operators module 328) and manage intermediate results. Most of the operators are executed directly in the calculation engine 320 (e.g., creating the union of several intermediate results). The remaining nodes of the calculation scenario 315 (not implemented in the calculation engine 320) can be transformed by the model executor 324 into a set of logical database execution plans. Multiple set operation nodes can be combined into one logical database execution plan if possible.

The model optimizer 322 can be configured to enable dynamic partitioning based on one or more aspects of a query and/or datasets used by queries. The model optimizer can implement a series of rules that are triggered based on attributes of incoming datasets exceeding specified thresholds. Such rules can, for example, apply thresholds each with a corresponding a parallelization factor. For example, if the incoming dataset has 1 million rows then two partitions (e.g., parallel jobs, etc.) can be implemented, or if the incoming dataset has five million rows then five partitions (e.g., parallel jobs, etc.) can be implemented, and the like.

The attributes of the incoming datasets utilized by the rules of model optimizer 322 can additionally or alternatively be based on an estimated and/or actual amount of memory consumed by the dataset, a number of rows and/or columns in the dataset, and the number of cell values for the dataset, and the like.

Database platforms such as the SAP Business Warehouse (BW) platform can offer tools to allow for the creation of data providers from existing database objects. For example, with the SAP BW platform, composite providers can be generated based on existing types of data objects such as InfoProviders (e.g. OLAP views, etc.), tables, data store objects or transient InfoProviders (e.g., SAP HANA platform views). In order to achieve a good query response time of such new providers the BW can push the complex calculations into the calculation engine 320 and use a calculation view like the all other objects. As such a tool can provide meaningful flexibility, the customer has the possibility to create more complex calculation models than in typical business warehouse scenarios. But as such business warehouse queries are not in typical SQL format, it can be difficult for the calculation engine 320 to execute complex calculations within expected query response times.

Figure 4:
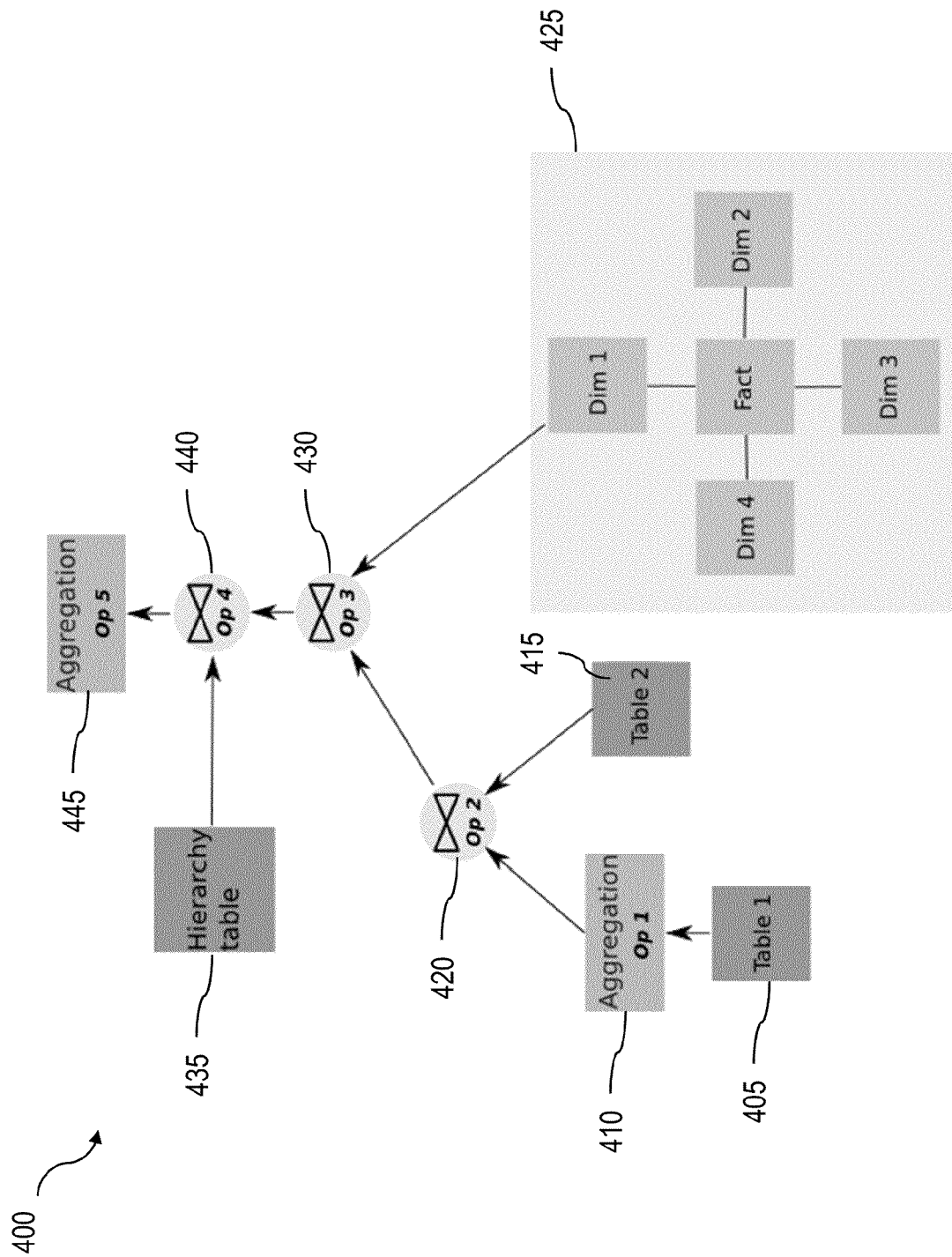
FIG. 4 is a diagram illustrating a query for execution by a calculation engine.

A common business warehouse calculation pattern or query for execution of a database coupled to the calculation engine 320 is shown in the diagram 400 of FIG. 4. Such queries can be often based on large OLAP views (stored or temporary cubes) that can be joined with other operation results (e.g. tables, views or intermediate operation results) and finally get modified by adding special hierarchy information to these results. With reference again to diagram 400 of FIG. 4, a first operation 410 (specified by a first calculation node of a corresponding calculation scenario) comprises an aggregation operation of Table 1 405. A second operation 420 (specified by a second calculation node of the calculation scenario) comprises joining intermediate results from the first operation 410 with Table 2 415. A third operation 430 (specified by a third calculation node of the calculation scenario) comprises joining intermediate results from the second operation 420 with a multi-dimensional fact table 425. A fourth operation 440 (specified by a fourth calculation node of the calculation scenario) comprises joining intermediate results of the third operation 430 with a hierarchical table 435. Lastly, a fifth operation 445 (specified by a fifth calculation node of the calculation scenario) comprises an aggregation of the intermediate results from the fourth operation 440).

Query runtime and resource consumption can be adversely impacted by queries such as those illustrated in FIG. 4, especially if large data has to be processed by the engine. Even though final query results can be very small after building up the hierarchical data representation, the underlying join operations must materialize all intermediate results which can be very expensive from performance and memory perspective on productive systems.

In order to address some of the drawbacks described above, a calculation engine operation can be provided, referred to herein at a join with aggregation operation (JoinWithAggregation) that can provide common business warehouse query functionalities (such as shown in FIG. 4) within one single operator for execution by the calculation engine 320 while also ensuring high performance and low memory consumption. The join with aggregation operation can implicitly (i.e., It is somehow hidden for the user that joins are internally deployed or translated into star schemas during execution time, etc.) transform business warehouse queries/calculation patterns into star schemas which in turn allows a fast and optimized execution within an OLAP engine. The join with aggregation operation can be characterized as being based on a transient extension of join paths that enables pushing down all performance-critical calculations into the OLAP layer during runtime. State differently, the main idea of the join with aggregation operation is that there will be one OLAP view that will consume most of the query time because it holds most of the data. The other input (e.g. OLAP view or table, etc.), in contrast, holds significantly less data. Without this new operation, there would have to be two joins of intermediate tables of queries on the join parties big and small OLAP view. The new operation join with aggregation enables for the materialization of only the input with less data. Then, this intermediate table is used to extend the existing big OLAP view only for this query. The extension is done transient or virtual and is only valid for the current query.

The advantage of this approach is that only a small data set is materialized and the big OLAP view is materialized in a natural manner because one need not materialize far too much data into a flat table instead the big data is consumed in their natural data-store. Additionally, it is often the case that the additional join with the small dataset will reduce the result set of big OLAP view by factors. Hence, a lot of time and memory can be saved because less data is materialized.

Figure 5:
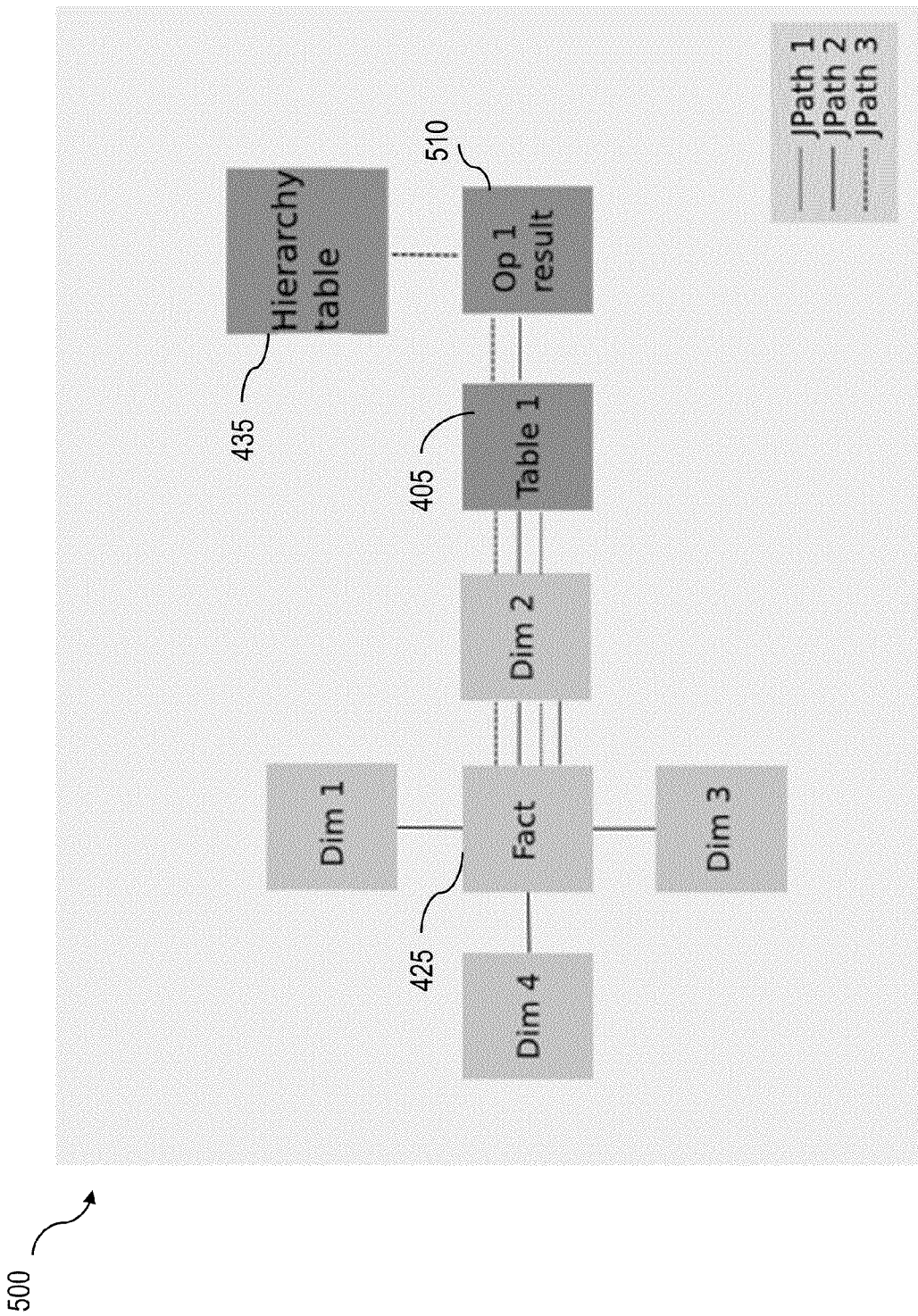
FIG. 5 is a diagram illustrating a transformation of the query of FIG. 4.

With reference to diagram 500 of FIG. 5, the join with aggregation operation, when executed by the calculation engine 320 and by using the model optimizer 322, can extend an existing OLAP cube by adding temporary join paths (JPath 1, JPath 2, JPath 3) to a corresponding metamodel that represents all join operation of the initial query. The result of these join paths are the operation result 510. With business warehouse applications, hierarchical data representation can be built up through joining user defined hierarchy tables. These hierarchy joins can also be modeled using transient join path extensions. A hierarchy table can be a table with two columns with one column holding the parent node and the other column holding the child node. Hierarchy tables can typically be user defined tables that provide a hierarchical representation of predefined result sets (e.g. mapping numeric ranges to discrete values, etc.). These hierarchy tables can be joined to the result sets (intermediate or final results) by inner joins. Thus hierarchies are from the calculation engine perspective 320 also just joins that can be executed by extending the metamodel of olap views. The OLAP view or the fact tables can contain the values of the child nodes. Then the business warehouse can initiate hierarchy operations in the applications server and then store the resulting parent/child hierarchy into a hierarchy table. Then this hierarchy table can be joined on the child node column with the OLAP view. The result column of this join is sometimes referred to as the parent column.

With the aggregation with join operation, the calculation engine 320 can now easily query extended OLAP cubes (i.e., OLAP cubes with transient path join extensions) using an OLAP engine that generates results of the join with aggregation operation (which can be consumed by other operations of the calculation engine 320). The OLAP engine can be part of the SAP HANA kernel and can be used by analytical applications. The OLAP engine is highly optimized for querying and aggregating analytical data which is represented by star schemas (one fact table and several dimension tables). In relation to the diagram 300 of FIG. 3, the OLAP engine is part of the column store. Pushing down all performance-critical operation steps (e.g. joining and aggregating) into the OLAP layer (which forms part of the logical layer 230 in FIG. 2) can, in most cases, avoid intermediate result materialization, for example, by choosing the best order of applying all operation steps.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive cdata and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying

What is claimed is:

1. A method comprising:
receiving, by a database server from a remote application server, a query associated with a calculation scenario that defines a data flow model that includes one or more calculation nodes, each calculation node defining one or more operations to execute on the database server;
transforming at least one of the calculation nodes into a star schema;
instantiating, by the database server, the calculation scenario with the transformed at least one calculation node;
executing, by a calculation engine of the database server, the operations defined by the calculation nodes of the instantiated calculation scenario other than the transformed at least one calculation node and executing, by an OLAP engine, the transformed at least one calculation node to collectively result in a responsive data set; and
providing, by the database server to the application server, the data set.

2. A method as in claim 1, wherein at least a portion of paths and/or attributes defined by the calculation scenario are not required to respond to the query, and wherein the instantiated calculation scenario omits the paths and attributes defined by the calculation scenario that are not required to respond to the query.

3. A method as in claim 1, wherein at least one of the calculation nodes filters results obtained from the database server.

4. A method as in claim 1, wherein at least one of the calculation nodes sorts results obtained from the database server.

5. A method as in claim 1, wherein the calculation scenario is instantiated in a calculation engine layer by a calculation engine.

6. A method as in claim 5, wherein the calculation engine layer interacts with a physical table pool and a logical layer, the physical table pool comprising physical tables containing data to be queried, and the logical layer defining a logical metamodel joining at least a portion of the physical tables in the physical table pool.

7. A method as in claim 1, wherein an input for each calculation node comprises one or more of: a physical index, a join index, an OLAP index, and another calculation node.

8. A method as in claim 7, wherein each calculation node has at least one output table that is used to generate the data set.

9. A method as in claim 8, wherein at least one calculation node consumes an output table of another calculation node.

10. A method as in claim 1, wherein the executing comprises:
forwarding the query to a calculation node in the calculation scenario that is identified as a default node if the query does not specify a calculation node at which the query should be executed.

11. A method as in claim 1, wherein the calculation scenario comprises database metadata.

12. A method as in claim 1, wherein one of the calculation nodes specifies a join with aggregation operation.

13. A system comprising:
a database server comprising memory and at least one data processor;
an application server in communication with and remote from the database server comprising memory and at least one data processor;
wherein the database server:
receives a query from the application server that is associated with a calculation scenario that defines a data flow model that includes one or more calculation nodes, each calculation node defining one or more operations to execute on the database server;
transforms at least one of the calculation nodes into a star schema;
instantiates the calculation scenario with the transformed at least one calculation node;
executes, using a calculation engine of the database server, the operations defined by the calculation nodes of the instantiated calculation scenario other than the transformed at least one calculation node and executes, by an OLAP engine, the transformed at least one calculation node to collectively result in a responsive data set; and
provides the data set to the application server.

14. A system as in claim 13, wherein there are a plurality of application servers coupled to the database server.

15. A system as in claim 14, wherein the database server executes three layers, a calculation engine layer, a logical layer, and a physical table pool.

16. A system as in claim 13, wherein at least a portion of paths and/or attributes defined by the calculation scenario are not required to respond to the query, and wherein the instantiated calculation scenario omits the paths and attributes defined by the calculation scenario that are not required to respond to the query.

17. A system as in claim 13, wherein the calculation scenario is instantiated in a calculation engine layer by a calculation engine.

18. A system as in claim 17, wherein the calculation engine layer interacts with a physical table pool and a logical layer, the physical table pool comprising physical tables containing data to be queried, and the logical layer defining a logical metamodel joining at least a portion of the physical tables in the physical table pool.

19. A system as in claim 13, wherein an input for each calculation node comprises one or more of: a physical index, a join index, an OLAP index, and another calculation node; wherein each calculation node has at least one output table that is used to generate the final result set.

20. A non-transitory computer program product storing instructions, which when executed by at least one data processor of at least one computing system, result in operations comprising:
receiving, by a database server from a remote application server, a query associated with a calculation scenario that defines a data flow model that includes one or more calculation nodes, each calculation node defining one or more operations to execute on the database server;
transforming at least one of the calculation nodes into a star schema;
instantiating, by the database server, the calculation scenario with the transformed at least one calculation node;
executing, by a calculation engine of the database server, the operations defined by the calculation nodes of the instantiated calculation scenario other than the transformed at least one calculation node and executing, by an OLAP engine, the transformed at least one calculation node to collectively result in a responsive data set; and providing, by the database server to the application server, the data set.

21. A non-transitory computer program product as in claim 20, wherein at least a portion of paths and/or attributes defined by the calculation scenario are not required to respond to the query, and wherein the instantiated calculation scenario omits the paths and attributes defined by the calculation scenario that are not required to respond to the query.

22. A non-transitory computer program product as in claim 20, wherein at least one of the calculation nodes filters results obtained from the database server.

23. A non-transitory computer program product as in claim 20, wherein at least one of the calculation nodes sorts results obtained from the database server.

24. A non-transitory computer program product as in claim 20, wherein the calculation scenario is instantiated in a calculation engine layer by a calculation engine.

25. A non-transitory computer program product as in claim 24, wherein the calculation engine layer interacts with a physical table pool and a logical layer, the physical table pool comprising physical tables containing data to be queried, and the logical layer defining a logical metamodel joining at least a portion of the physical tables in the physical table pool.

26. A non-transitory computer program product as in claim 20, wherein an input for each calculation node comprises one or more of: a physical index, a join index, an OLAP index, and another calculation node.

27. A non-transitory computer program product as in claim 26, wherein each calculation node has at least one output table that is used to generate the data set.

28. A non-transitory computer program product as in claim 27, wherein at least one calculation node consumes an output table of another calculation node.

29. A non-transitory computer program product as in claim 20, wherein the executing comprises:
    forwarding the query to a calculation node in the calculation scenario that is identified as a default node if the query does not specify a calculation node at which the query should be executed.

30. A non-transitory computer program product as in claim 20, wherein the calculation scenario comprises database metadata.

31. A non-transitory computer program product as in claim 20, wherein one of the calculation nodes specifies a join with aggregation operation.

* * * * *